US009123040B2

(12) United States Patent
Kelly et al.

(10) Patent No.: US 9,123,040 B2
(45) Date of Patent: Sep. 1, 2015

(54) SYSTEMS AND METHODS FOR ENCODED ALIAS BASED TRANSACTIONS

(75) Inventors: Nicholas Kelly, Phoenix, AZ (US); Man Sugathan, Phoenix, AZ (US); James Tune, Phoenix, AZ (US); Daniel Yong, Phoenix, AZ (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 13/034,227

(22) Filed: Feb. 24, 2011

(65) Prior Publication Data

US 2012/0191611 A1  Jul. 26, 2012

Related U.S. Application Data

(63) Continuation-in-part of application No. 13/011,643, filed on Jan. 21, 2011.

(51) Int. Cl.
*G06Q 20/00* (2012.01)
*G06Q 20/38* (2012.01)

(52) U.S. Cl.
CPC ............ *G06Q 20/382* (2013.01); *G06Q 20/385* (2013.01)

(58) Field of Classification Search
None
See application file for complete search history.

(56) References Cited

U.S. PATENT DOCUMENTS

| | | | |
|---|---|---|---|
| 5,590,197 A * | 12/1996 | Chen et al. ........................ 705/65 |
| 5,784,463 A | 7/1998 | Chen et al. | |
| 7,370,012 B2 | 5/2008 | Karns et al. | |
| 7,660,772 B2 | 2/2010 | Verkama | |
| 7,748,618 B2 | 7/2010 | Vawter | |
| 7,886,962 B2 | 2/2011 | Vawter | |
| 2001/0005840 A1 | 6/2001 | Verkama | |
| 2002/0023027 A1 | 2/2002 | Simonds | |
| 2002/0073025 A1 | 6/2002 | Tanner et al. | |
| 2002/0073042 A1 | 6/2002 | Maritzen et al. | |
| 2002/0073044 A1 | 6/2002 | Singhal | |
| 2003/0163708 A1 | 8/2003 | Tang | |
| 2003/0172037 A1 | 9/2003 | Jung et al. | |
| 2003/0230630 A1 | 12/2003 | Whipple et al. | |
| 2004/0078332 A1 | 4/2004 | Ferguson et al. | |
| 2004/0098350 A1 | 5/2004 | Labrou et al. | |
| 2004/0107170 A1 | 6/2004 | Labrou et al. | |
| 2004/0210498 A1 | 10/2004 | Freund | |
| 2005/0027543 A1 | 2/2005 | Labrou et al. | |
| 2005/0132194 A1 * | 6/2005 | Ward ............................ 713/176 |
| 2005/0187873 A1 * | 8/2005 | Labrou et al. ................... 705/40 |
| 2005/0240484 A1 | 10/2005 | Yan et al. | |
| 2006/0010008 A1 * | 1/2006 | Metry ................................ 705/2 |
| 2006/0165060 A1 | 7/2006 | Dua | |
| 2006/0206709 A1 | 9/2006 | Labrou et al. | |
| 2007/0022058 A1 | 1/2007 | Labrou et al. | |

(Continued)

OTHER PUBLICATIONS

USPTO; Office Action dated Apr. 26, 2011 in U.S. Appl. No. 13/011,999.

(Continued)

*Primary Examiner* — Zeshan Qayyum
(74) *Attorney, Agent, or Firm* — Meyertons, Hood, Kivlin, Kowert & Goetzel, P.C.

(57) ABSTRACT

Disclosed is a computer based method for securing a financial transaction. A transaction device does not include any human readable data that can be used to identify the account owner and/or the transaction account. A first code and a second code are combined to determine an alias transaction account code. A transaction account is determined based upon the alias transaction account code.

18 Claims, 8 Drawing Sheets

(56) References Cited

U.S. PATENT DOCUMENTS

| | | | |
|---|---|---|---|
| 2007/0078723 A1 | 4/2007 | Downes et al. | |
| 2007/0198432 A1 | 8/2007 | Pitroda et al. | |
| 2008/0195536 A1* | 8/2008 | Karns et al. | 705/39 |
| 2009/0117883 A1 | 5/2009 | Coffing et al. | |
| 2009/0119190 A1 | 5/2009 | Realini | |
| 2009/0222353 A1 | 9/2009 | Guest et al. | |
| 2009/0248581 A1* | 10/2009 | Brown | 705/67 |
| 2009/0254440 A1* | 10/2009 | Pharris | 705/17 |
| 2010/0063895 A1 | 3/2010 | Dominguez et al. | |
| 2010/0125509 A1 | 5/2010 | Kranzley et al. | |
| 2010/0138344 A1* | 6/2010 | Wong et al. | 705/44 |
| 2010/0145860 A1 | 6/2010 | Pelegero | |
| 2010/0198730 A1 | 8/2010 | Ahmed et al. | |
| 2010/0199089 A1 | 8/2010 | Vysogorets et al. | |
| 2010/0219234 A1 | 9/2010 | Forbes | |
| 2010/0235882 A1 | 9/2010 | Moore | |
| 2010/0299734 A1 | 11/2010 | Lynch et al. | |
| 2011/0029416 A1 | 2/2011 | Greenspan | |
| 2011/0071914 A1 | 3/2011 | Beasley et al. | |
| 2011/0173684 A1 | 7/2011 | Hurry et al. | |
| 2011/0191251 A1 | 8/2011 | Al-herz et al. | |
| 2011/0209208 A1 | 8/2011 | Quach et al. | |

OTHER PUBLICATIONS

USPTO; Advisory Action dated Dec. 13, 2011 in U.S. Appl. No. 13/011,999.
USPTO; Final Office Action dated Sep. 19, 2011 in U.S. Appl. No. 13/011,999.
Menezes, Handbook of Applied Cryptography, 1997, CRC Press, Inc., p. 15-21 and 25-41.
Defier, How Networks Work, 2004, Que Publishing, 7th Edition, p. 103, 110-111.
USPTO; Office Action dated Dec. 6, 2011 in U.S. Appl. No. 13/011,643.
Advisory Action dated Sep. 11, 2012 in U.S. Appl. No. 13/011,643.
Final Office Action dated Jul. 6, 2012 in U.S. Appl. No. 13/011,643.
International Search Report and Written Opinion dated May 8, 2012 in Application No. PCT/US2012/021968.
Office Action in U.S. Appl. No. 13/011,999 mailed Feb. 20, 2015, 17 pages.
International Preliminary Report on Patentability dated May 20, 2013 in Application No. PCY/US2012/021968.
Office Action in U.S. Appl. No. 13/011,999 mailed Jun. 30, 2014, 14 pages.

* cited by examiner

Front of Card
805

Encoded Alias
Account Number
810

Magnetic Stripe
825

Back of Card
815

Encoded
Security Key
820

SYSTEMS AND METHODS FOR ENCODED ALIAS BASED TRANSACTIONS

RELATED APPLICATIONS

This application is a continuation-in-part of U.S. patent application Ser. No. 13/011,643, entitled "System and Methods for Virtual Mobile Transaction," filed on Jan. 21, 2011, which is hereby incorporated by reference in its entirety.

FIELD OF INVENTION

The present disclosure generally relates to a system and a method for conducting a financial transaction, and in particular, to securing a financial transaction using encoded alias identifiers.

BACKGROUND

Consumers often use financial transaction instruments as convenient forms of payment for purchases of goods, services and/or items instead of using, for example, cash or checks. Traditionally, a financial transaction instrument is embodied as a card-shaped device, also referred to herein as a "card," and may be any of the following: a credit card, a charge card, a debit card, a pre-paid or stored-value card, or the like.

In regard to use of a financial transaction account, a consumer may communicate or interact with a traditional merchant in person (e.g., at a store), telephonically, or electronically (e.g., from a computer via the Internet). During the interaction, the merchant may offer good/services to the customer. The merchant also may offer the customer an option to pay for the goods/services using any number of available transaction accounts via their corresponding financial transaction instruments. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as the following: a telephone network; an intranet; the global, public Internet; a point of interaction device (e.g., a point of sale (POS) device, personal digital assistant (PDA), mobile phone, kiosk, etc.); online communications; off-line communications; wireless communications; and/or the like.

Although financial transaction instruments (e.g., cards and fob-type devices) provide consumers with a convenient way to pay for purchases and also provide traditional merchants with a convenient way to obtain payment for purchases, a user still needs to carry around a physical financial transaction instrument; as such, there is oftentimes a risk of theft and fraud.

Given the foregoing, a long-felt need exists for a system that conveniently enables consumers to make a purchase that does not require the use of a transaction device that includes human readable data. Furthermore, there is a need for a system that enables a person to securely complete a financial transaction without exposing the user's actual account number to the public eye; thus reducing the risk of theft and fraud.

SUMMARY

The present disclosure meets the above-mentioned needs by providing new methods, systems and computer program products for initiating a payment for a purchase transaction using encoded data. According to one embodiment, a computer based method enables a financial transaction that is based upon encoded account alias data.

A financial transaction computer obtains a first code and a second code from a transaction device. In an embodiment, the first code and the second code are QR codes that are attached to a transaction device such as a card and the card is more secure than a traditional card because the card does not show any human readable data (e.g., no name, account number, etc.).

The computer determines based upon the first code, a first alias transaction account code. In an embodiment, the first code comprises a plurality of alias transaction account codes and uses a predetermined rule or algorithm to determine the first alias transaction account code. Based upon the second code the computer determines a first security key. The computer determines a second alias transaction account code using the first alias account code and the first security key. The computer submits an authorization request for a financial transaction and the authorization request includes the second alias transaction account code.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements.

DETAILED DESCRIPTION

Overview

Figure 1:
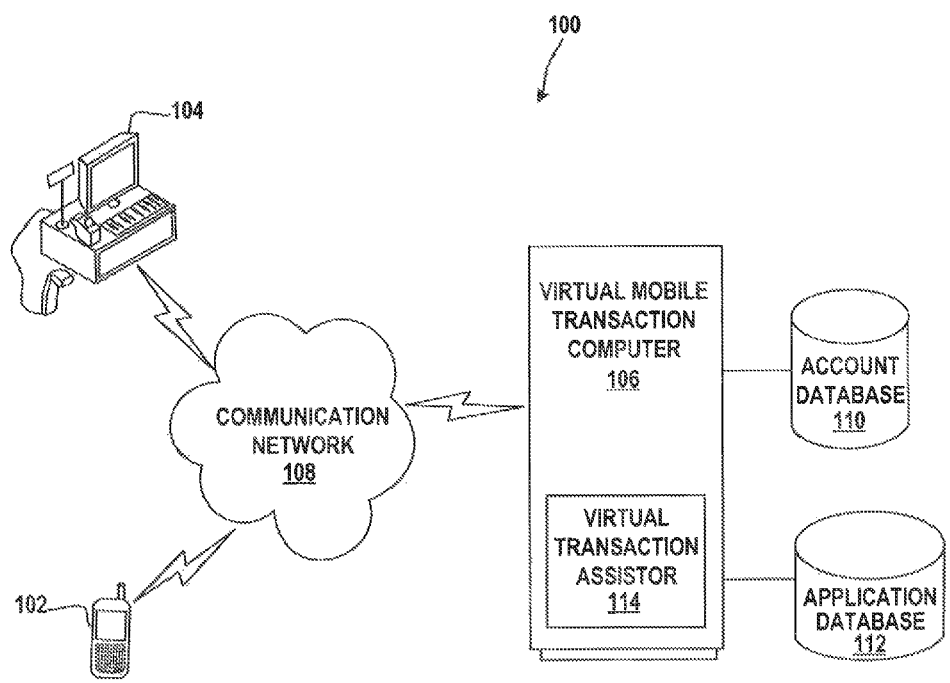
FIG. 1 is an exemplary environment in which virtual mobile transaction computer may be deployed, according to an embodiment.

The detailed description of exemplary embodiments herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure is described herein with reference to system architecture, block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Terminology

A "merchant" may include any individual, business, entity, group, charity, software and/or hardware that desire to offers goods or services for sale. For example, a merchant may be a restaurant that wishes to offer a discount to consumers within a defined geographic proximity of the restaurant location. In the context of the present application, the merchant may also be termed as an "offeror"

A "consumer" or "customer" may include any individual, business, entity, group, charity, software and/or hardware that desires to utilize the system to obtain promotional items or purchase items from a merchant. "Account holders", or similar phrases, may include any individual, group, charity, entity, software and/or hardware that is associated with an account in certain ways, such as a user, customer, member, rights holder, benefit from the account, affiliated with the account and/or the like. Transaction account holders may include all (or any subset of) account holders associated with a particular issuer, account holders with a certain type of account, primary account holders, subsidiary account holders, relatives of account holders, responsible parties of account holders, parties impacted by the account and/or the like. It is noted that the terms "customer," "consumer," "user," "account holder" and "population" may be used interchangeably herein.

An "offer", as used herein, may include any discounts, awards, gift card, items, rebate on any products and/or services provided by a merchant.

"Item" may include any good, service, information, experience, event, show, access, restriction, monetary value, loyalty points, non-monetary value and/or the like.

A "mobile device" may include, for example, any of mobile telephones, beepers, pagers, IPODs (e.g., mobile entertainment devices), personal digital assistants (PDAs), BLACKBERRY type devices (e.g., mobile or cellular phones, smart phones, and the like), and/or any device capable of being moved from one location to another.

An "account," "account number," or "account code", includes any device, code, number, letter, symbol, digital certificate, smart chip, digital signal, analog signal, biometric, or other identifier/indicia suitably configured to allow a consumer to access, interact with, or communicate with a financial transaction system. The account number may optionally be located on or associated with any financial transaction instrument (e.g., a rewards, charge, credit, debit, prepaid, telephone, embossed, smart, magnetic stripe, bar code, transponder, or radio frequency card).

An "issuer" may represent a financial institution that provides the financial transaction instrument to an individual, also referred to herein as an "account holder". Oftentimes, the "account holders" are the same as the "consumers," "customers" or "users" referred to above. The issuer can also be an "acquirer," which can be a financial institution that provides card processing services.

It is noted that references in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

The systems, methods and computer program products disclosed in conjunction with various embodiments of the present disclosure are embodied in a systems and methods for intelligently providing offers to a plurality of populations. The nomenclature "offers" is only exemplary and used for descriptive purposes, and must not be construed to limit the scope of the present disclosure.

The present disclosure is now described in more detail herein in terms of the above disclosed exemplary embodiments of system, processes and computer program products. This is for convenience only and is not intended to limit the application of the present disclosure. In fact, after reading the following description, it will be apparent to one skilled in the relevant art(s) how to implement the following disclosure in alternative embodiments System FIG. 1 shows an exemplary environment 100 in which the present disclosure may be utilized. Environment 100 includes a user device 102 (or "mobile device 102"), Point of Sales ("POS") device 104, a virtual mobile transaction computer 106, a communication network 108, an account database 110 and an application database 112. In an embodiment, virtual mobile transaction computer 106 may be associated with a server, which is managed by an issuer (e.g., American Express®). User device 102 and POS device 104 may communicate with virtual mobile transaction computer 106 over communication network 108. Examples of communication network 108 may include, but not limited to, a wide area network (WAN), a local area network (LAN), an Ethernet, Internet, an Intranet, a cellular network, a satellite network, or any other suitable network for transmitting data. Communication network 108 may be implemented as a wired network, a wireless network or a combination thereof.

POS device 104 is associated with the merchant and generally refers to as "checkout" terminals or more generally to the hardware and software used for checkouts and payments for one or more transactions done at a merchant location. Mobile device 102 may be a mobile telephone, a handheld device, a smart phone, a personal digital assistant (e.g., a BLACKBERRY), a portable computer, or any other device able to perform wireless data communication with virtual mobile transaction computer 106. Mobile device 102 may be equipped with BLUETOOTH, NFC ("near-field communication"), and/or infrared (e.g., IrDA) communication modules, which enables Mobile device 102 to communicate wirelessly with other devices in its proximity or in its line of sight. Optionally, to ensure security, communications may occur indirectly with POS device 104 and/or virtual mobile transaction computer 106 through a security filter (not shown) such as, for example, a firewall, which may be implemented with hardware, software, or a combination thereof. Other types of security measures may be employed, as will be appreciated by persons of skill in the relevant art(s).

Virtual mobile transaction computer 106 may communicate with and/or access a plurality of databases in/from which information is stored/retrieved, such as, but not limited to, an applications database 112 and an accounts database 110. Applications database 112 may store one or more applications that can be uploaded to (or downloaded by) user device 102 via a wireless transmission using communication network 108. Accounts database 110 may store information on transaction accounts.

According to an embodiment, applications database 112 includes applications created according to the J2EE platform established by JAVA (e.g., a software development platform). In an embodiment, mobile device 102 may download (or upload) an application; e.g., a J2EE application downloaded using ".jad" and ".jar" technology.

Applications database 112 and account databases 110 may include any device (e.g., personal computer), which communicates (in any manner discussed herein) with virtual mobile transaction computer 106 via any network discussed herein. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that applications database 112 and accounts database 110 may or may not be in direct contact with virtual mobile transaction computer 106. For example, virtual mobile transaction computer 106 may access the services of applications database 112 and accounts database 110 through another server, which may have a direct or indirect connection to communication network 108.

Applications database 112 and account databases 110 may employ any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of applications database 112 and accounts database 110, the data can be stored without regard to a common format. However, in one exemplary embodiment of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, customers or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate. The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. Applications database 112 and accounts database 110 contemplates a data storage arrangement wherein the header or trailer, or header or trailer history, of the data is stored on the transaction instrument in relation to the appropriate data. One skilled in the art will also appreciate that, for security reasons, any databases, systems, devices, servers or other components of applications database 112 and accounts database 110 may consist of any combination thereof at a single location or at multiple locations, wherein each database or system includes any of various suitable security features, such as firewalls, access codes, encryption, decryption, compression, decompression, and/or the like.

In an exemplary implementation as shown in FIG. 1, virtual mobile transaction computer 106 may include a virtual transaction assistor 114, which is communicatively coupled to mobile device 102 and POS device 104 through communication network 108. In an embodiment, virtual transaction assistor 114 is deployed as a software/application running on virtual mobile transaction computer 106. In one embodiment, virtual transaction assistor 114 is configured to receive one or more requests, associated with a purchase transaction, from user device 102 of the customer and communicate with user devise 102 to initiate a payment for the purchase transaction.

The disclosure may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, lookup tables, and/or the like, which may carry out a variety of functions under the control of one or more microprocessors or other control devices. Similarly, software elements may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that various embodiments of the system may employ any number of conventional techniques for data transmission, signaling, data processing, network control, and/or the like. Still further, the system may be configured to detect or prevent security issues with a client-side scripting language, such as JavaScript, VBScript or the like.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (e.g. a non-transitory memory such as a hard disc or DVD) that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Figure 2:
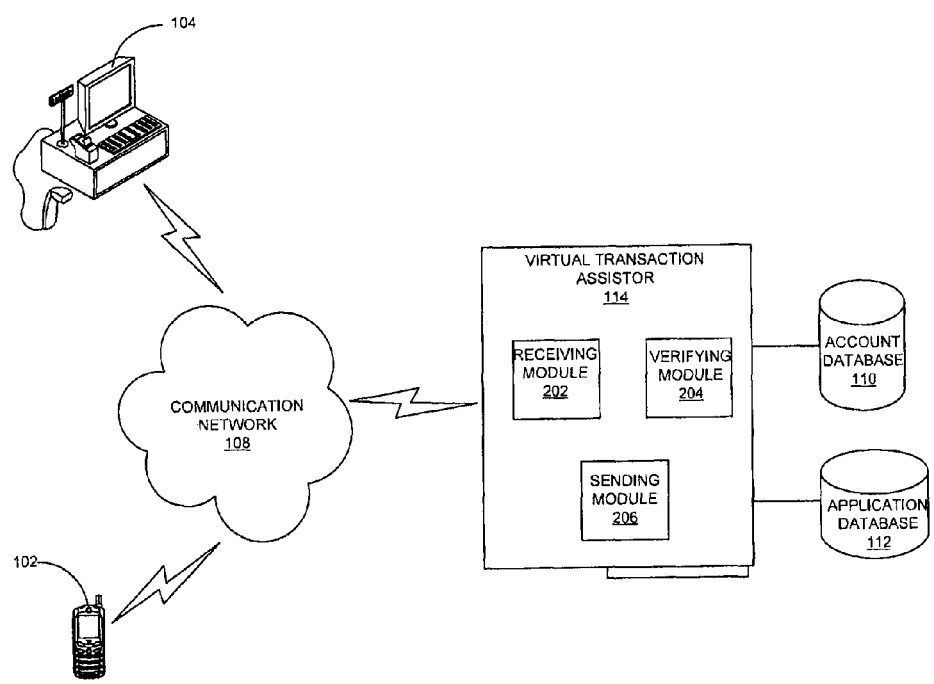
FIG. 2 is an exemplary implementation of a virtual transaction assistor, according to an embodiment.

Referring now to FIG. 2, an exemplary implementation of virtual transaction assistor 114 is depicted, according to an embodiment of the present disclosure. As shown in FIG. 2 a virtual transaction assistor 114 may include a receiving module 202, a verifying module 204, and a sending module 206.

As shown in the exemplary embodiment of FIG. 2, virtual transaction assistor 114 is communicatively coupled to user device 102 (mobile device 102) of the customer through communication network 108. Further, virtual transaction assistor 114 is configured to access accounts database 110 and applications database 112. In an embodiment, virtual transaction assistor 114 communicates with mobile device 102 of the customer to initiate a purchase transaction.

In an exemplary embodiment, receiving module 202 receives a request from mobile device 102 of the customer. The request may be initiated when the customer has made the purchases at a merchant location and is in the process of making payments to the merchant. In an embodiment, receiving module 202 may receive the request through mobile device 102 in one or more possible manners. The one or more possible manners may include, but not limited to, receiving a phone call, a text message, a multimedia message, an email, a request routed through internet facility available on mobile device 102, through a webpage accessible on mobile device 102 and the like. In an embodiment, receiving module 202 may receive the request through an application running on mobile device 102 of the customer. In one embodiment, the application is a micro application provided by, for example, the issuer of the transaction account associated with the customer.

In an embodiment, the customer downloads the application on mobile device 102 through the server associated with virtual mobile transaction computer 106. During installation of the application, the issuer may send a message to mobile device 102. The message may be sent using, for example, push technology. In an embodiment, the message includes a URL for a .jad file and requests a user of mobile device 102 to confirm that download of the application is desired. The message is received by mobile device 102 and the user confirms that download is desired by sending a reply to the message. The message and the reply may be, for example, SMS messages. In an embodiment, the reply causes a web host, hosted on the server, to use the URL to retrieve the .jad file, which then is sent to mobile device 102. The .jad file includes a URL for a .jar file. As will be appreciated by persons skilled in the art, a .jad file is a descriptor file for a .jar file. Because .jar files can be large, the purpose of the .jad file is to enable mobile device 102 to download a small .jad file initially, which contains detailed information on the content of the corresponding .jar file. The detailed information may include, for example, the source of the .jar file, the size of the .jar file, etc. In an embodiment, mobile device 102 reads and executes the .jad file, which causes web host to download the .jar file to mobile device 102 based on the URL for the .jar file included in .jad file. The .jar file has been downloaded to mobile device 102 and the user is asked to confirm that download of the payment application is desired. The user responds affirmatively to the request, web host may retrieve the application from application database and causes the application to download to mobile device 102.

In one embodiment, receiving module 202 receives a registration request from the customer to register mobile device 102 (e.g., with the issuer and/or a third party provider). Receiving module 202 may receive the registration request via, for example, a phone call, a text message, a multimedia message, an email, a request routed through internet facility available on mobile device 102, through a webpage assessable on mobile device 102, short messaging service, a multimedia message service, a computer, a webpage associated with the issuer or a third party vendor and the like. Receiving module 202 associates mobile device 102 with the customer. In an embodiment, receiving module 202 associates mobile device 102 one of the customer's transaction accounts. In one embodiment, receiving module 202 invokes sending module 206 to send a token to mobile device 102 which is received by mobile device 102 and associated with the application running on mobile device 102. In an embodiment, the request received by virtual transaction assistor 114 includes the token associated with the application running on mobile device 102.

Verifying module 204 may verify the user and mobile device 102 associated with the user based at least in part on the request and user device 102. In an embodiment, verifying module 204 may verify the user and mobile device 102 based on one or more parameters. The one or more parameters include, for example, caller identification data, automatic number identification (ANI) data associated with the phone call, mobile device specific code, a mobile identification number (MIN), an international mobile equipment identifier (IMEI), a personal identification code included in the request, a personal identification number (PIN) included in the request and the like. In one embodiment, the request includes the token and verifying module 204 authenticates the application, and the token associated with the application.

In an embodiment, virtual transaction assistor 114 invokes sending module 206 to send a prompt to mobile device 102 of the user for additional information. The additional information may be used in a verification process. Such additional information includes, for example, personal identification of the user, date of birth of the user, social security number of the user, a mailing address of the user and the like. Receiving module 202 receives the additional information from the user which may be then utilized by verifying module 204 to verify the user and mobile device 102 associated with the user.

Verifying module 204 determines the transaction account associated with the customer. In an embodiment, verifying module 204 accesses accounts database 110 to determine and verify the transaction account associated with the user and/or mobile device 102 of the user. Sending module 206 sends a barcode to mobile device 102. In an embodiment, sending module 206 sends the barcode via a multimedia message on mobile device 102 of the user. The barcode comprise, for example, a QR Code®, a micro QR Code, a matrix bar code, a two-dimensional bar code and the like. The barcode is used to initiate a payment for the purchase transaction associated with the request received by receiving module 202. For more information regarding QR Code technology, see http://www.denso-wave.com/qrcode/, last visited on Jan. 30, 2011, which is hereby incorporated by reference in its entirety.

In one embodiment, virtual transaction assistor 114 generates bar code data. The bar code data may be sent to mobile device 102 of the user in alphanumeric format (alphanumeric sequence) or in the form of an electronic image of a bar code.

In an embodiment, sending module 206 sends the bar code to mobile device 102 where the bar code includes both the barcode image and an alphanumeric code. In an, sending module 206 sends the bar code data to mobile device 102 and mobile device 102 generates a bar code image using the bar code data. For example, the bar code data may be converted into the bar code image by the application running on mobile device 102 of the user. In an embodiment, an application running on mobile device 102 receives a token or seed and the application generates a bar code using (or based upon) the token or seed. For example, sending device 206 transmits a token pass code which mobile device 102's resident application uniquely decodes or deciphers to seed it into then generating a unique bar code.

The bar code may be displayed in mobile device 102 and read by a POS device 104 in any manner known in the art. POS device 104 may include a barcode reader, which may read the barcode from a display associated with mobile device 102. In one embodiment, mobile device 102 transmits the data associated with the barcode to POS device 104.

In an embodiment, receiving module 202 receives an additional data request from mobile device 102 of the user. For example, in some circumstances, mobile device 102 may not be capable of displaying a bar code, generating a bar code from bar code data, transmitting encoded data, etc. Sending module 206 may send an alphanumeric code to mobile device 102 of the user. The alphanumeric code may be encoded in the barcode format or may be in "human readable" form and may serve as a one time pass-code for the transaction.

In one embodiment, POS device 104 sends an authorization request for the purchase transaction to an issuer associated with the transaction account of the user. In an embodiment, the authorization request may be in ISO-8583 authorization request format. In one embodiment, the authorization request may include a pass-code derived from the bar code. The pass-code may be onetime pass-code, which is derived from the alphanumeric sequence received from virtual transaction assistor 114.

In an embodiment, the issuer verifies that the transaction associated with the authorization request is legitimate. For example, the issuer may match the onetime pass code included in the authorization request with the alphanumeric sequence. The purchase transaction may be processed in accordance with conventional infrastructure and technology.

In an embodiment, if the user wishes to make an online transaction, the bar code may also be provided with a numeric or alphanumeric sequence corresponding to the bar code that may be read by the user and entered into the appropriate field on a webpage. In an embodiment, the user completing an online transaction uses a personal bar code reader to read the bar code into a computing device (e.g. for input into a web page).

In an embodiment, the transaction is completed using the barcode data and onetime pass code and the information contained in the bar code may expire and will no longer be valid for use in future transactions. The bar code may also expire after a predetermined amount of time if the financial transaction is not completed within a predetermined amount of time.

Figure 3:
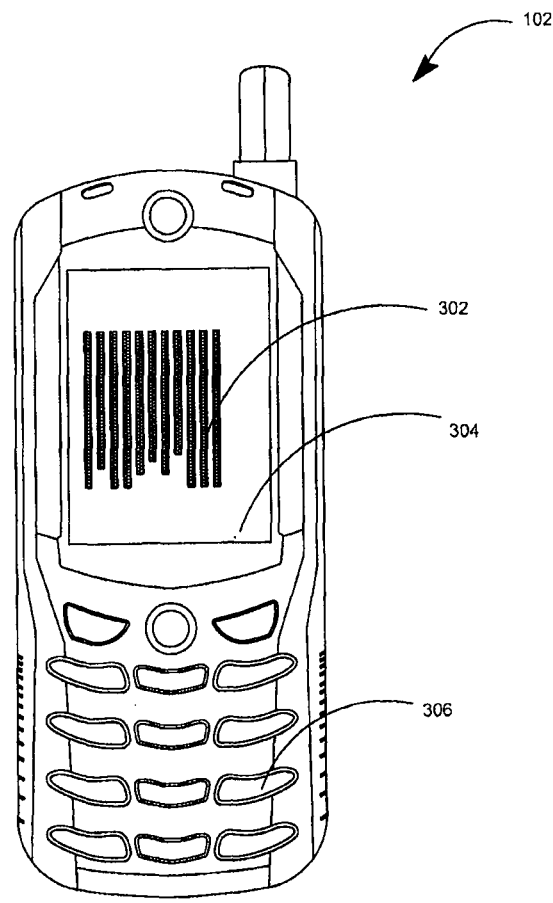
FIG. 3 illustrates a barcode displayed on a user device, according to an embodiment.

An example of how a barcode 302 may appear is shown in FIG. 3. Mobile device 102 has a screen 304 on which the barcode 302 may appear. In this embodiment, only the barcode 302 is shown, but it should be understood that the numeric sequence associated with the barcode 302 may appear on the screen as well. Mobile device 102 is also provided with interface 306 having any combination of numbers, letters and symbols to allow a user to enter information into mobile device 102 to be stored in the mobile device 102 and/or to be communicated wirelessly, for example, by short messaging service.

Process Overview

Figure 4:
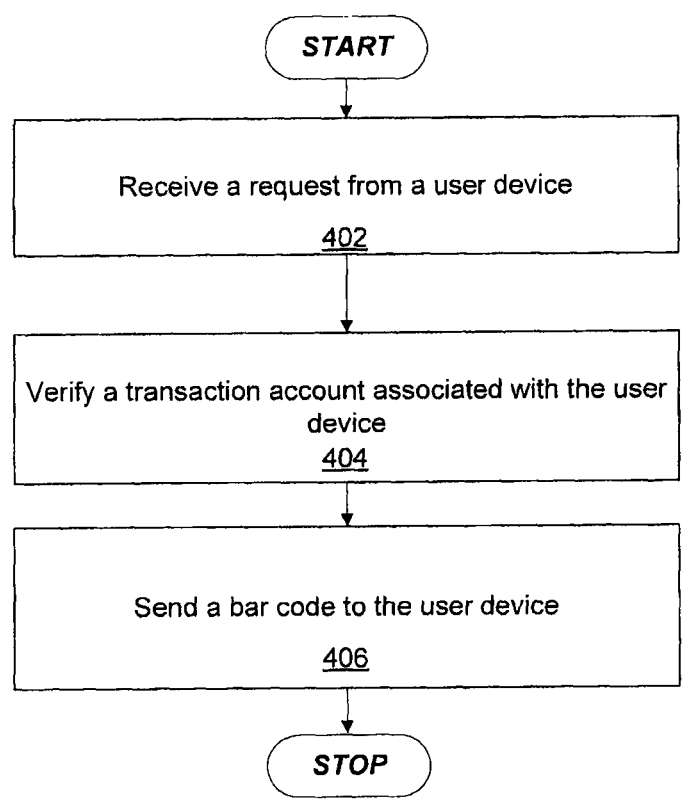
FIG. 4 is a flowchart illustrating a process for initiating a payment for a purchase transaction, according to an embodiment.

FIG. 4 is a flowchart illustrating one example process 400 for initiating a payment for a purchase transaction, according to an embodiment of the present disclosure. Virtual transaction assistor 114 is communicatively coupled to user device 102 (mobile device 102) of the customer through communication network 108. Further, virtual transaction assistor 114 may be configured to access accounts database 110 and applications database 112. In an embodiment, virtual transaction assistor 114 is deployed as a software/application running on virtual mobile transaction computer 106.

In one embodiment, virtual transaction assistor 114 receives a request from mobile device 102 (at step 402). For example, the request may be initiated when the customer has initiated a purchase at a merchant location and is in the process of making payments to the merchant. Virtual transaction assistor 114 receives the request through mobile device 102 in one or more possible manners. The one or more possible manners includes, for example, receiving a phone call, a text message, a multimedia message, an email, a request routed through internet facility available on mobile device 102, through a webpage assessable on mobile device 102 and the like.

Virtual transaction assistor 114 verifies the user and mobile device 102 associated with the user based at least in part on the request and user device 102 and determine a transaction account associated with user device 102 (step 404). In an embodiment, verifying module 204 verifies the user and mobile device 102 based on one or more parameters. The one or more parameters includes, for example, caller identification data, automatic number identification (ANI) data associated with the phone call, mobile device specific code, a mobile identification number (MIN), an international mobile equipment identifier (IMEI), a personal identification code included in the request, a personal identification number (PIN) included in the request and the like.

In an embodiment, virtual transaction assistor 114 may send a prompt to mobile device 102 of the user for additional information. The additional information may be required, but not limited to, for verification purposes. In an embodiment, the additional information may include, but not limited to, personal identification of the user such as, but not limited to, date of birth of the user, social security number of the user, a mailing address of the user and the like. Virtual transaction assistor 114 may receive the additional information from the user which may be utilized by virtual transaction assistor 114 to verify the user and mobile device 102 and thus determine the associated transaction account with user device 102.

In an embodiment, virtual transaction assistor 114 may access accounts database 110 to determine and verify the transaction account associated with the user and mobile device 102 of the user.

Virtual transaction assistor 114 may send a barcode to mobile device 102 (at step 406). In an embodiment, virtual transaction assistor 114 may send the barcode through a multimedia message on mobile device 102 of the user. The barcode may include any one of, but not limited to, a QR code, a matrix bar code, a two-dimensional bar code and the like. The barcode is used to initiate a payment for the purchase transaction associated with the request received by virtual transaction assistor 114.

In an embodiment, virtual transaction assistor 114 generates bar code data on successful authentication and verification of the user and mobile device 102 of the user. The bar code data may be sent to mobile device 102 of the user in alphanumeric format (alphanumeric sequence) or in the form of an electronic image of a bar code.

In an embodiment, virtual transaction assistor 114 may send the bar code to mobile device 102 where the bar code includes both the barcode image and an alphanumeric code. The alphanumeric code is encoded in the barcode format and may serve as a one time pass-code for the transaction. In an embodiment, virtual transaction assistor 114 sends the bar code data to mobile device 102 and mobile device 102 generates a bar code image using the bar code data. Further, bar code may be displayed in mobile device 102 and read by a POS device 104 in any manner known in the art. For example, POS device 104 may include a barcode reader, which may read the barcode from a display associated with mobile device 102 and correspondingly, mobile device 102 transmits the data associated with the barcode to POS device 104.

In an embodiment, POS device 104 sends an authorization request for the purchase transaction to an issuer associated with the transaction account of the user. The authorization request may include a pass code derived from the bar code. The pass-code may be onetime pass-code, which is derived from the alphanumeric sequence received from virtual transaction assistor 114. In an embodiment, the pass-code may be a limited use identifier associated with a use restriction. The use restriction may be associated with the initial request received by virtual transaction assistor 114.

Since the bar code and the alphanumeric sequence was generated by virtual transaction assistor 114, which is associated with the issuer, the issuer may verify that the transaction associated with the authorization request is legitimate, by matching the onetime pass code included in the authorization request with the alphanumeric sequence. The purchase transaction may then be processed in accordance with conventional infrastructure and technology.

In an embodiment, if the user wishes to make an online transaction, the bar code may also be provided with a numeric or alphanumeric sequence corresponding to the bar code that may be read by the user and entered into the appropriate field on a webpage. The user completing an online transaction might, in the alternative, use a personal bar code reader. The transaction may then be accordance with conventional infrastructure and technology.

In an embodiment, the information contained in the bar code may expire and will no longer be valid for use in future transactions (e.g., once the transaction has been completed using the barcode data and onetime pass code expiration occurs). The bar code may also expire after a predetermined amount of time if the financial transaction is not completed within a predetermined amount of time.

Figure 5:
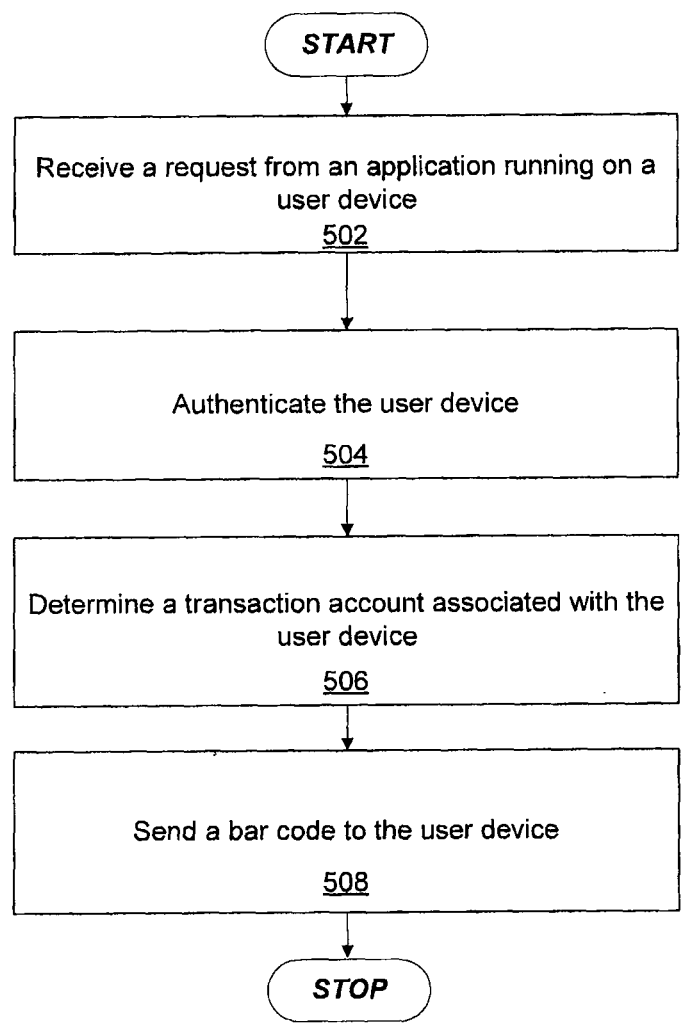
FIG. 5 is a flowchart illustrating a process for initiating a payment for a purchase transaction, according to an embodiment.
Figure 6:
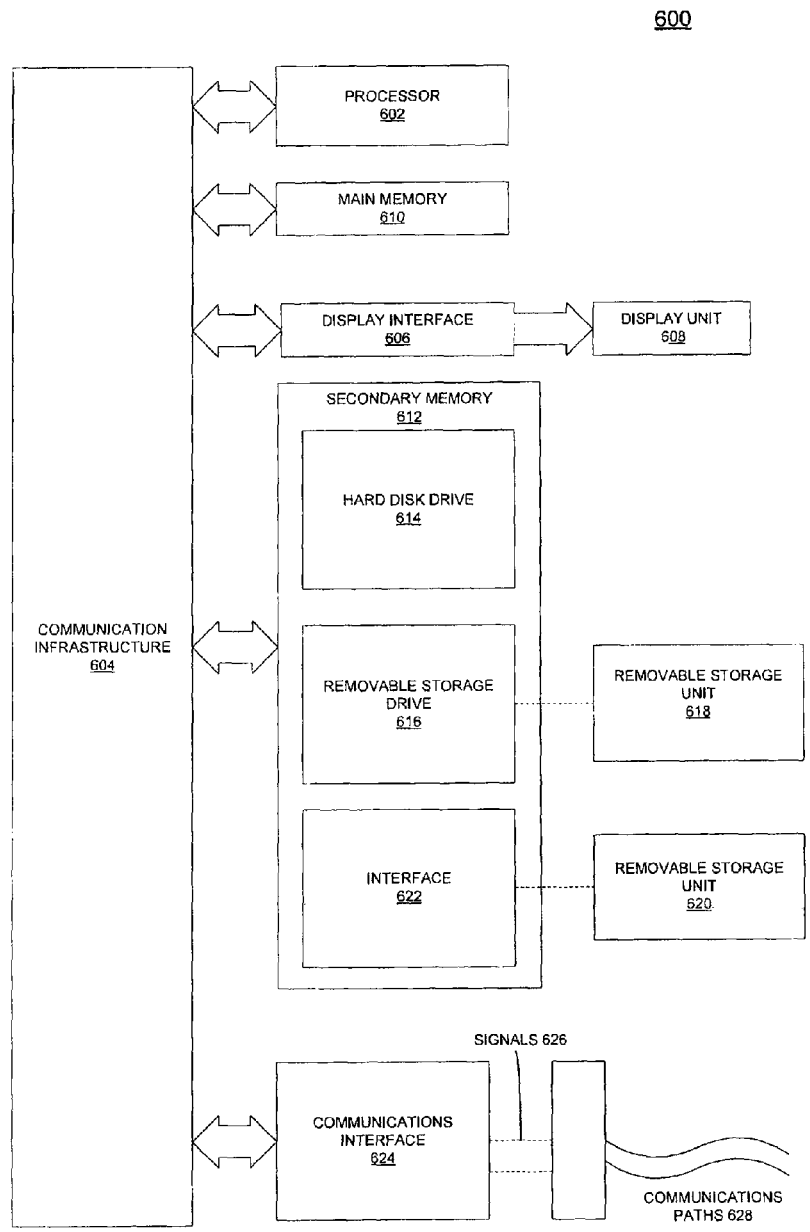
FIG. 6 is a block diagram of an exemplary computer system, according to an embodiment.

FIG. 5 is a flowchart illustrating one example process 500 for initiating a payment for a purchase transaction, according to another embodiment of the present disclosure.

In an embodiment, virtual transaction assistor 114 may receive a request from an application running on mobile device 102 of the customer (at step 502). In an exemplary embodiment, the application is a micro application provided by the issuer of the transaction account associated with the customer. In an embodiment, the customer may download the application on mobile device 102 through the server associated with virtual mobile transaction computer 106.

Further, in an embodiment, virtual transaction assistor 114 may receive a registration request from the customer to register mobile device 102 with the issuer or a third party provider. Virtual transaction assistor 114 may receive the registration request through, but not limited to, a phone call, a text message, a multimedia message, an email, a request routed through internet facility available on mobile device 102, through a webpage accessible on mobile device 102, short messaging service, a computer, a webpage associated with the issuer or a third party vendor and the like. Receiving module 202 associates mobile device 102 with the customer and/or with at least one of the transaction accounts of the customers. Further, virtual transaction assistor 114 may send a token to mobile device 102 which is received by mobile device 102 and associated with the application running on mobile device 102. In an embodiment, the request received by virtual transaction assistor 114 includes the token associated with the application running on mobile device 102.

In an embodiment, virtual transaction assistor 114 may authenticate the user and mobile device 102 associated with the user (at step 504). In one embodiment, verifying module 204 verifies the user and mobile device 102 based on one or more parameters. The one or more parameters may include, but not limited to, caller identification data, automatic number identification (ANI) data associated with the phone call, mobile device specific code, a mobile identification number (MIN), an international mobile equipment identifier (IMEI), a personal identification code included in the request, a personal identification number (PIN) included in the request and the like. In an alternative embodiment, if the request includes the token and is received through the application running on mobile device 102, then virtual transaction assistor 114 may first authenticate the application, and the token associated with the application.

In one embodiment, in response to successful verification and authentication, virtual transaction assistor 114 determines the transaction account associated with user device 102 (at step 506). In an embodiment, virtual transaction assistor 114 accesses accounts database 110 to determine the transaction account associated with the user and mobile device 102 of the user.

Virtual transaction assistor 114 may send a barcode to mobile device 102 (at step 508). In an embodiment, virtual transaction assistor 114 may send the barcode via a multimedia message on mobile device 102 of the user. The barcode may include, for example, a QR code, a matrix bar code, a two-dimensional bar code and the like. The barcode is used to initiate a payment for the purchase transaction associated with the request received by virtual transaction assistor 114. In an embodiment, virtual transaction assistor 114 generates a bar code data. The bar code data may be sent to mobile device 102 of the user in alphanumeric format (alphanumeric sequence) or in the form of an electronic image of a bar code.

In an embodiment, virtual transaction assistor 114 may send the bar code to mobile device 102 where the bar code includes both the barcode image and an alphanumeric code. In an embodiment, virtual transaction assistor 114 may send the bar code data to mobile device 102 and mobile device 102 generates a bar code image using the bar code data. The bar code data may be converted into the bar code image by the application running on mobile device 102 of the user.

The bar code may be displayed in mobile device 102 and read by a POS device 104 in any manner known in the art. The POS device 104 may include a barcode reader, which may read the barcode from a display associated with mobile device 102 and/or mobile device 102 may transmit the data associated with the barcode to POS device 104.

In an embodiment, virtual transaction assistor 114 may receive an additional data request from mobile device 102. For example, in response to an additional data request, virtual transaction assistor 114 may send an alphanumeric code to mobile device 102 of the user. The alphanumeric code may be encoded in the barcode format and may serve as a one time pass-code for the transaction.

POS device 104 sends an authorization request for the purchase transaction to an issuer associated with the transaction account of the user. In an embodiment, the authorization request includes a pass-code derived from the bar code. The pass-code may be onetime pass-code, which is derived from the alphanumeric sequence received from virtual transaction assistor 114. In an embodiment, the pass-code may be a limited use identifier associated with a use restriction. The use restriction may be associated with the initial request received by virtual transaction assistor 114.

Since the bar code and the alphanumeric sequence was generated by virtual transaction assistor 114, which is associated with the issuer, the issuer may verify that the transaction associated with the authorization request is legitimate, by matching the onetime pass code included in the authorization request with the alphanumeric sequence. The purchase transaction may then be processed in accordance with conventional infrastructure and technology.

In an embodiment, if the user wishes to make an online transaction, the bar code may also be provided with a numeric or alphanumeric sequence corresponding to the bar code that may be read by the user and entered into the appropriate field on a webpage. The user completing an online transaction might, in the alternative, use a personal bar code reader. The transaction may then be accordance with conventional infrastructure and technology.

In an embodiment, once the transaction has been completed using the barcode data and onetime pass code, the information contained in the bar code may expire and will no longer be valid for use in future transactions. The bar code may also expire after a predetermined amount of time, if the financial transaction is not completed within a predetermined amount of time.

Enhanced transaction security may be enabled through the use of encoded data and/or novel transaction devices. Traditional transaction devices such as a card (e.g., plastic credit or debit card) can be less secure because they typically include human readable data of the card holder and/or account number (e.g., card holder name, card number and security code (e.g., CID (American Express) or CVV2 (Visa, Mastercard, and Discover)). These transaction devices are susceptible to fraud because data for charging to the transaction account is visible and readable to a human perpetrator.

A more secure transaction may be enabled using encoded transaction data, where transaction data includes alias account numbers and security keys. For example, the transaction data may be encoded in a machine readable code (e.g., a QR Code®, a micro QR Code, a matrix bar code, a two-dimensional bar code, etc). Thus, the transaction data is not legible or understandable to a person.

In an embodiment, the computer-implemented transaction method described herein includes providing a proxy or "alias" code ("alias account code") to a merchant system during a transaction instead of providing sensitive transaction account information. A proxy code does not include any (or may include minimal) sensitive information about a transaction device user or transaction account. Instead, a merchant system generally receives a proxy code, which takes the place of the sensitive information ordinarily received during transaction completion. In other words, certain information (e.g., the user's actual account number) is not transmitted to the merchant. Thus, in an embodiment, the user's account number is not available should the merchant system be compromised. The use of proxy codes in a financial transaction is disclosed in detail in U.S. Pat. No. 7,543,738 entitled "System And Method For Secure Transactions Manageable By A Transaction Account Provider," issued on Jun. 9, 2009, which is hereby incorporated by reference in its entirety.

The alias account code may be a limited use identifier associated with a use restriction. For example, use may be limited to a particular merchant, type of product, transaction amount, number of transactions, timeframe, etc. For more information regarding transactions that involve limited use identifiers and use restrictions see, for example, U.S. Pat. No. 7,627,531, entitled "System For Facilitating a Transaction," issued on Dec. 1, 2009 and U.S. patent and U.S. Pat. No. 7,472,827, entitled "Limited Use Pin System And Method," issued on Jan. 6, 2009, both of which are hereby incorporated by reference in their entireties.

In an embodiment, additional financial transaction security is provided by encoding a plurality of account numbers and/or security keys into the machine readable code. For example, in one embodiment a QR Code may comprise data for multiple (e.g., 20) alias account numbers. An algorithm or predetermined rule is used to identify the alias account number from among the multiple alias account numbers read from the machine readable code. Similarly, a number of security keys may be associated with the machine readable code that is read (e.g., by a POS device) and a different algorithm or predefined rule may be used to identify the security key to be used to select the security key to use with the transaction.

In various embodiments, a predetermined rule for selecting an alias account code and/or a security key comprises determining based upon at least one of a date, a time, a merchant type, a transaction type, a location, a product type, a transaction instrument and a payment network. For example, a POS at a particular merchant (or merchant type) may be configured to always choose the fifth alias account code or a POS may be configured to choose two security codes and alternate between the two the security codes depending on the current date.

Security for a transaction may be further enhanced by determining a second alias account code based upon the first alias account code and the security key. As those of skill in the art will appreciate, various algorithmic and cryptographic methods exist to combine a security key with a number in order to generate a second number. Thus, even if the first alias account code and security key is compromised, the actual code that accompanies a transaction request (e.g., a second alias account code) is still protected. Additionally, enabling a computing device such as a POS terminal or a mobile device to determine a second alias account code based upon two inputs allows flexibility in issuing or changing accounts and the associated security for conducting financial transactions with the accounts. For example, a merchant may be configured to issue a prepaid account for purchases at the merchant. In one embodiment, the merchant may print a sticker comprising a QR Code and issue the sticker to a customer where the QR Code has encoded on it data comprising an alias transaction account code. When wishing to complete a transaction, the user may present the new (i.e., merchant issued) QR code and an existing QR Code that comprises data containing a security key. In one embodiment, QR codes are encoded onto sticker that is configured to be removably attached to a transaction device (e.g. a transaction card).

In one embodiment, a merchant POS device obtains the machine readable codes and determines a first alias account number and security key for the transaction. The POS device is configured with logic to combine the first alias account number and the security key and determine a second alias account code for the transaction. In an embodiment, a mobile device such as, for example, a user's mobile device is configured to obtain the encoded transaction data and determine a second alias account code based upon the first alias account number and the security key. For example, one or more QR Codes are read by a scanning app running on the mobile device and a financial transaction app determines a first alias account code and a security key and applies an algorithm to determine a second alias account code to submit for a financial transaction.

Figure 7:
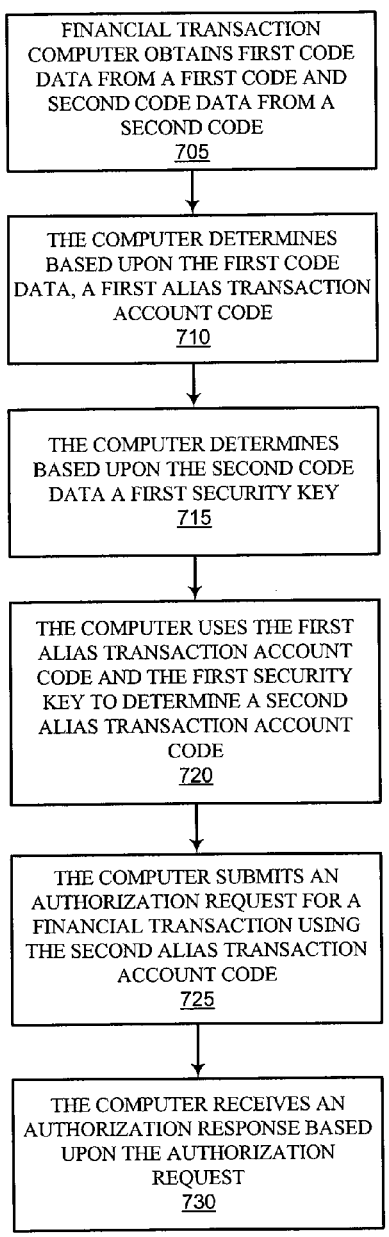
FIG. 7 is a flowchart illustrating a process for using an encoded alias account code to secure a transaction, according to an embodiment.
Figure 8:
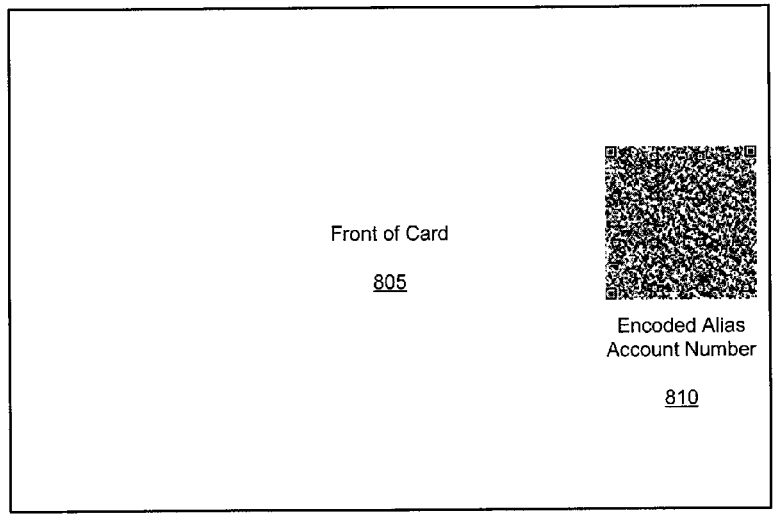
FIG. 8 is an illustration of a transaction device, according to an embodiment.
Figure 8:
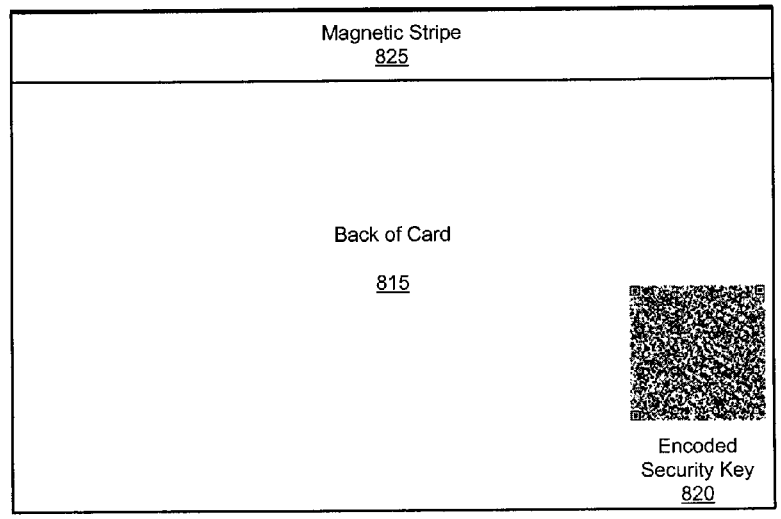

FIG. 7 is a flowchart illustrating one example process 700 for initiating a payment for a purchase transaction, according to an embodiment of the present disclosure. A financial transaction computer obtains first code data from a first code and second code data from a second code (Step 705). In an embodiment, obtaining the first code data and the second code data comprises scanning a first side of the transaction device and scanning a second side of the transaction device. For example, the transaction device may be a plastic card with similar form factor of a traditional magnetic strip credit card with the first code on the front of the card and the second code on the back of the card. With brief reference to FIG. 8, an embodiment of a plastic transaction device card is illustrated. Front of card 805 includes an encoded alias account number 810 and back of card 815 comprises an encoded security key and a magnetic stripe. In an embodiment front of card may include, for example, an account holder's name or alias. As one of ordinary skill of the art will recognize other embodiments of a transaction device may include the encoded security key on the front side and the encoded account number on the back side or the encoded security key and the encoded account number on the same side of the card. A device may be configured to simultaneously read (e.g., scan) the front and the back side of a transaction device. The transaction device may be of any shape or form. In an embodiment, the transaction device has no human readable data, no human readable data identifying the customer and/or no human readable data identifying a transaction account. For example, transaction device may be a card includes a first code on the front, a second code on the back but does not include a name, an account number or a security code.

The financial transaction computer determines based upon the first code data, a first alias transaction account code (Step 710) and determines based upon the second code data a first security key (Step 715). As previously disclosed, the first code data and/or the second code data may comprise a plurality of data and the computer may execute a predetermined rule or algorithm in order to determine the appropriate alias account code and security key from the data obtained from the codes.

The computer uses the first alias transaction account code and the first security key to determine a second alias transaction account code (Step 720). In one embodiment, determining the second alias transaction account code may comprise receiving input from a third party system (e.g. over a network connection). In an embodiment, the computer obtains (e.g., receives input from a user) a second security key and determining the second alias transaction account code is based upon the first alias account code, the first security key and the second security key. For example, in various embodiments, a second security key may be a password, a personal identification code, biometric data and/or data encoded in a magnetic strip associated with the transaction device.

The computer submits an authorization request for a financial transaction, wherein the authorization request comprises the second alias transaction account code (Step 725) and receives an authorization response based upon the authorization request (Step 730). In an embodiment, the authorization response is created by an account issuer or a payment network based upon determining a customer account based upon the second alias transaction account.

While the steps outlined above, with respect to process 400, 500 and 700 represent specific embodiments, practitioners will appreciate that there are any number of computing algorithms and user interfaces that may be applied to create similar results. The steps are presented for the sake of explanation only and are not intended to limit the scope of the disclosure in any way.

Example Implementations

The present disclosure (i.e., virtual transaction assistor, process 400, 500 and/or 700, any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations may include general-purpose digital computers or similar devices.

In fact, one embodiment is directed towards one or more computer systems capable of carrying out the functionality described herein.

The computer system 700 includes at least one processor, such as a processor 602. Processor 602 is connected to a communication infrastructure 604, for example, a communications bus, a cross over bar, a network, and the like. Various software embodiments are described in terms of this exemplary computer system 700. After reading this description, it will become apparent to a person skilled in the relevant art(s) how to implement the present disclosure using other computer systems and/or architectures.

The computer system 600 includes a display interface 606 that forwards graphics, text, and other data from the communication infrastructure 604 for display on a display unit 608.

The computer system 600 further includes a main memory 610, such as random access memory (RAM), and may also include a secondary memory 612. The secondary memory 612 may further include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a well known manner. The removable storage unit 618 may represent a floppy disk, magnetic tape or an optical disk, and may be read by and written to by the removable storage drive 616. As will be appreciated, the removable storage unit 618 includes a computer usable storage medium having stored therein, computer software and/or data.

In this document, the terms "computer program medium," "computer readable medium" and "computer usable medium" are used to generally refer to media such as the removable storage drive 616, a hard disk installed in hard disk drive 614, the signals 626, and the like. These computer program products provide software to the computer system 600. The present disclosure is directed to such computer program products.

Computer programs (also referred to as computer control logic) are stored in the main memory 610 and/or the secondary memory 612. Computer programs may also be received via the communication interface 604. Such computer programs, when executed, enable the computer system 600 to perform the features, as discussed herein. In particular, the computer programs, when executed, enable the processor 602 to perform the features of the present disclosure. Accordingly, such computer programs represent controllers of the computer system 600.

In accordance with an embodiment, where the disclosure is implemented using a software, the software may be stored in a computer program product and loaded into the computer system 600 using the removable storage drive 616, the hard disk drive 616 or the communication interface 624. The control logic (software), when executed by the processor 602, causes the processor 602 to perform the functions of the present disclosure as described herein.

In an embodiment, the system is implemented primarily in hardware using, for example, hardware components such as application specific integrated circuits (ASIC). Implementation of the hardware state machine so as to perform the functions described herein will be apparent to persons skilled in the relevant art(s). In one embodiment, the system is implemented using a combination of both the hardware and the software.

CONCLUSION

While various embodiments have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages, are presented for example purposes only. The architecture of the present disclosure is sufficiently flexible and configurable, such that it may be utilized (and navigated) in ways other than that shown in the accompanying figures.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the disclosure. It should be understood that the detailed description and specific examples, indicating exemplary embodiments of the disclosure, are given for purposes of illustration only and not as limitations. Many changes and modifications within the scope of the instant disclosure may be made without departing from the spirit thereof, and the disclosure includes all such modifications. Corresponding structures, materials, acts, and equivalents of all elements in the claims below are intended to include any structure, material, or acts for performing the functions in combination with other claim elements as specifically claimed. The scope of the disclosure should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The invention claimed is:

1. A method, comprising:
    obtaining, by a computer-based system for facilitating a secure transaction and from a virtual mobile transaction computer, first encoded data and second encoded data;
    obtaining, by the computer-based system, a plurality of alias transaction account codes by decoding the first encoded data;
    obtaining, by the computer-based system, a first alias transaction account code by selecting at least one of the plurality of alias transaction account codes;
    obtaining, by the computer-based system, a plurality of security keys by decoding the second encoded data;
    obtaining, by the computer-based system, a first security key by selecting at least one of the plurality of security keys;
    generating, by the computer-based system, a second alias transaction account code by encrypting the first alias transaction account code with the first security key; and
    displaying, by the computer-based system, the second alias transaction account code as part of an authorization request for a financial transaction.

2. The method of claim 1, wherein at least one of the first encoded data and the second encoded data is a quick response ("QR") code.

3. The method of claim 1, further comprising determining, by the computer-based system, the first alias transaction account code based upon at least one of a date, a time, a merchant type, a transaction type, a location, a product type, a transaction instrument, or a payment network.

4. The method of claim 1, further comprising:
    determining, by the computer-based system, the first security key based upon at least one of a date, a time, a merchant type, a transaction type, a location, a product type, a transaction instrument, or a payment network.

5. The method of claim 1, further comprising:
    receiving, by the computer-based system, a second security key; and
    determining, by the computer-based system, the second alias transaction account code based upon the first alias transaction account code, the first security key and the second security key.

6. The method of claim 5, wherein the second security key comprises at least one of a password, a personal identification code, a biometric, or data encoded in a magnetic strip associated with a transaction device.

7. The method of claim 1, further comprising displaying, by the computer-based system, the second alias transaction account code to a point of sale (POS) device;
    wherein the computer-based system is a mobile hone device, and wherein the virtual mobile transaction computer is a server system associated with an issuer of transaction accounts.

8. The method of claim 1, further comprising:
    receiving, by the computer-based system, an authorization response based upon the authorization request, wherein the authorization response is created based upon an authenticating and by at least one of an account issuer or a payment network, and wherein the authenticating comprises determining a customer account based upon the second alias transaction account code; and
    facilitating completion of the financial transaction based upon the authorization response.

9. The method of claim 8, further comprising receiving, by the computer-based system, a settlement request based upon the authorization response, wherein the settlement request comprises at least one of the first alias transaction account code, the second alias transaction account code, or the customer account.

10. An article of manufacture including a non-transitory, tangible computer readable storage medium having instructions stored thereon that, in response to execution by a computer-based system for facilitating a secure transaction, cause the computer-based system to perform operations comprising:
- obtaining, by the computer-based system and from a virtual mobile transaction computer, first encoded data and second encoded data;
- obtaining, by the computer-based system, a plurality of alias transaction account codes by decoding the first encoded data;
- obtaining, by the computer-based system, a first alias transaction account code by selecting at least one of the plurality of alias transaction account codes;
- obtaining, by the computer-based system, a plurality of security keys by decoding the second encoded data;
- obtaining, by the computer-based system, a first security key by selecting at least one of the plurality of security keys;
- generating, by the computer-based system, a second alias transaction account code by encrypting the first alias transaction account code with the first security key; and
- displaying, by the computer-based system, the second alias transaction account code as part of an authorization request for a financial transaction.

11. The article of manufacture of claim 10, wherein at least one of the first encoded data and the second encoded data is a quick response ("QR") code.

12. The article of manufacture of claim 10, the operations further comprising determining, by the computer-based system, the first alias transaction account code based upon at least one of a date, a time, a merchant type, a transaction type, a location, a product type, a transaction instrument, or a payment network.

13. The article of manufacture of claim 10, the operations further comprising:
- determining, by the computer-based system, the first security key based upon at least one of a date, a time, a merchant type, a transaction type, a location, a product type, a transaction instrument, or a payment network.

14. The article of manufacture of claim 10, the operations further comprising:
- receiving, by the computer-based system, a second security key; and
- determining, by the computer-based system, the second alias transaction account code based upon the first alias transaction account code, the first security key and the second security key.

15. The article of manufacture of claim 14, wherein the second security key comprises at least one of a password, a personal identification code, a biometric, or data encoded in a magnetic strip associated with a transaction device.

16. The article of manufacture of claim 10, the operations further comprising displaying, by the computer-based system, the second alia transaction account code to a point of sale (POS) device.

17. The article of manufacture of claim 10, the operations further comprising:
- receiving, by the computer-based system, an authorization response based upon the authorization request, wherein the authorization response is created based upon an authenticating and by at least one of an account issuer or a payment network, and wherein the authenticating comprises determining a customer account based upon the second alias transaction account code; and
- facilitating completion of the financial transaction based upon the authorization response.

18. A system for facilitating a secure transaction, comprising;
- a processor; and,
- a tangible, non-transitory memory configured to communicate with the processor, the tangible, non-transitory memory having instructions stored thereon that, in response to execution by the processor, cause the system to perform operations comprising:
- obtaining, by the system and from a virtual mobile transaction computer, first encoded data and second encoded data:
- obtaining, by the system, a plurality of alias transaction account codes by decoding the first encoded data;
- obtaining, by the system, a first alias transaction account code by selecting at least one of the plurality of alias transaction account codes;
- obtaining, by the system, a plurality of security keys by decoding the second encoded data;
- obtaining, by the system, a first security key by selecting at least one of the plurality of security keys;
- generating, by the system, a second alias transaction account code by encrypting the first alias transaction account code with the first security key; and
- displaying, by the system, the second alias transaction account code as part of an authorization request for a financial transaction.

* * * * *